United States Patent
Smith et al.

(10) Patent No.: US 9,319,835 B2
(45) Date of Patent: Apr. 19, 2016

(54) SECURELY MANAGED LOCATION-AND-TRACKING SERVICE ACCESS

(71) Applicant: Intel Corporation, Santa Clara, CA (US)

(72) Inventors: Ned M. Smith, Beaverton, OR (US); Adi Shaliv, Nir-Banim (IL)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 14/119,493

(22) PCT Filed: Sep. 19, 2013

(86) PCT No.: PCT/US2013/060642
§ 371 (c)(1),
(2) Date: Nov. 22, 2013

(87) PCT Pub. No.: WO2015/041654
PCT Pub. Date: Mar. 26, 2015

(65) Prior Publication Data
US 2015/0079933 A1    Mar. 19, 2015

(51) Int. Cl.
*H04M 1/66*    (2006.01)
*H04W 4/02*    (2009.01)
*H04W 12/06*    (2009.01)
*G01S 5/02*    (2010.01)
*G01C 21/20*    (2006.01)
*H04W 4/04*    (2009.01)
*H04L 29/06*    (2006.01)
*H04W 84/12*    (2009.01)

(52) U.S. Cl.
CPC .. *H04W 4/02* (2013.01); *G01S 5/02* (2013.01); *H04W 4/028* (2013.01); *H04W 12/06* (2013.01); *G01C 21/206* (2013.01); *H04L 63/0869* (2013.01); *H04L 63/0876* (2013.01); *H04W 4/043* (2013.01); *H04W 84/12* (2013.01)

(58) Field of Classification Search
CPC .......... H04W 4/02; H04W 5/02; H04W 12/06
USPC .............................. 455/411; 370/338
See application file for complete search history.

(56) References Cited

U.S. PATENT DOCUMENTS

| 2010/0186069 A1* | 7/2010 | Liu ................................ 726/4 |
| 2011/0013588 A1* | 1/2011 | Jeon et al. ....................... 370/331 |
| 2013/0212377 A1* | 8/2013 | Malek ............................ 713/155 |
| 2014/0075502 A1* | 3/2014 | Aissi et al. ...................... 726/1 |

* cited by examiner

*Primary Examiner* — Marcos Batista
(74) *Attorney, Agent, or Firm* — Schwegmann Lundberg & Woessner, P.A.

(57) ABSTRACT

Systems and techniques for securely managed location-and-tracking service (LTS) access are described herein. A trusted execution environment (TEE) may establish a connection to an LTS. The TEE may provide verification to the LTS that the connection origination from the TEE. The TEE may request an LTS location for the mobile device from the LTS using the connection. The TEE may provide the LTS location to applications of the mobile device.

25 Claims, 4 Drawing Sheets

SECURELY MANAGED LOCATION-AND-TRACKING SERVICE ACCESS

CLAIM OF PRIORITY

This application is a U.S. National Stage Application under 35 U.S.C. 371 from International Application No. PCT/US2013/060642, filed Sep. 19, 2013, which is hereby incorporated by reference in its entirety.

TECHNICAL FIELD

Embodiments described herein generally relate to determining mobile device physical location and more specifically to securely managed location-and-tracking service (LTS) access.

BACKGROUND

Location based services for mobile devices are becoming a more important. Generally, these services include applications on a mobile device or backend cloud services that may use the physical location of the mobile device to tailor communications to the user, provide context to user data, and share user location data for other purposes. Accurately determining the physical location of the mobile device (e.g., and thus the user) may be a function of a number of internal (e.g., with respect to the mobile device) and external systems.

Generally, the mobile device is equipped with a global positioning system (GPS) based mechanism to determine its physical location. Such mechanisms may include a GPS antenna connected to a sensor hub. GPS readings may be taken and analyzed to determine the physical location. In an example, the readings may be communicated to an external system for analysis and the determined physical location returned to the mobile device. Generally, GPS based location determination is performed by the system hardware and software of the mobile device and provided to applications running on the mobile device. Generally, the accuracy of GPS based location systems declines as fewer satellites are visible (e.g., a signal may be received from them). This often becomes an issue when the mobile device is indoors.

LTS systems may be used to provide physical locations in a particular area. For example, when the mobile device is indoors (e.g., inside of a structure) an LTS system may be used. LTS systems generally monitor the mobile device and determine the location of the mobile device. For example, the LTS may be connected to a variety of wireless area network (WLAN) access points (APs) and use trilateration based on signal strength between the mobile device and the access points to determine a location of the mobile device. This is in contrast to the GPS based systems where the mobile device directly determines its location. As used herein, LTS systems provide mobile device locations within a limited (e.g., pre-defined) coverage area. Example LTS coverage areas may include a structure (e.g., a building, convention center, etc.), a subset of a structure (e.g., a department store in a shopping mall), a courtyard, a complex (e.g., entertainment venue, festival grounds, school campus, etc.). An LTS coverage area is not as broad as a city, state, or other large area in which a mobile device directly determines its location. Generally, LTSs are accessed directly by applications on the mobile device and not by the system hardware or software. For example, a department store application connects directly to the LTS for the department store to provide area specific sale notifications or coupons.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Location based services encounter a few problems given the GPS and LTS based mechanisms discussed above. First, GPS is generally only available in outdoor settings. Thus, a combination of GPS and LTS based mechanisms are needed to provide ubiquitous physical location awareness. Second, GPS and LTS mechanisms are generally accessible via different paths, namely via the mobile device system for GPS and via direct connection to the LTS for LTS. Further, because LTS services determine locations of mobile devices outside of the mobile device, a privacy issue arises as to whom may be provided this data.

The above problems may be addressed by a trusted execution environment (TEE) arranged to interface with the LTS in a secure manner and provide the LTS location data to mobile device applications along with the GPS location information. Thus, a seamless location interface may be used by the applications to support location based services. Further, by using a TEE, the LTS may be assured of the originating environment from with location requests are made and thus trust the information thus provided to identify the mobile device and assure that location privacy is maintained. Additional details and examples are provided below with respect to FIGS. 1-4.

Figure 1:
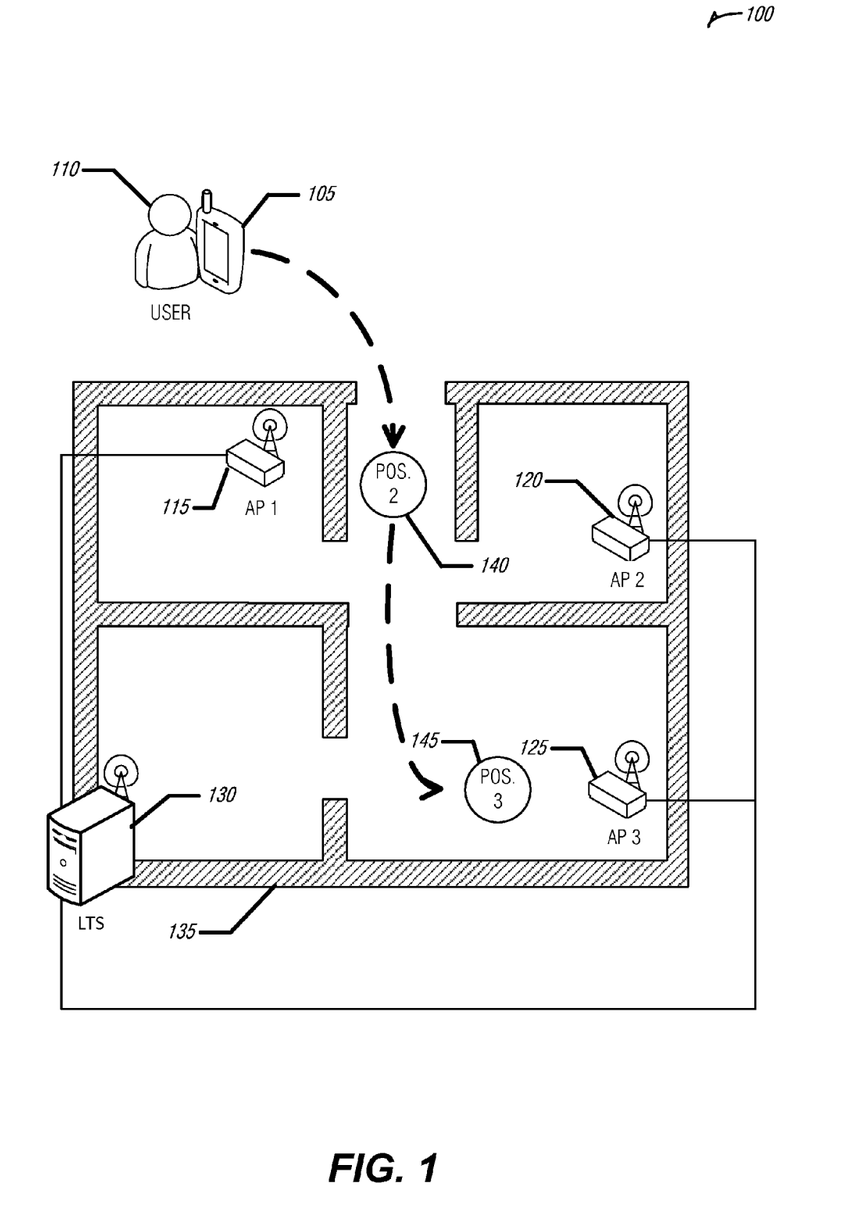
FIG. 1 illustrates an example of an environment in which securely managed LTS access may be used, according to an embodiment.

FIG. 1 illustrates an example of an environment 100 in which securely managed LTS access may be used. A user 110 may be operating a mobile device 105. Example mobile devices may include smart phones, personal digital assistants, tablet computers, or other electronic devices capable of being moved with the user 110 in a convenient manner. As illustrated, the user 110 and mobile device 105 begin in a first position, outside of a structure 135. The dashed arrows illustrate a route by which the user 110 and mobile device 105 move to a second position 140 within the structure 135, and then later to a third position 145 within the structure 135. Movement from the second position 140 to the third position 145 may be called "roaming" within the structure 135.

As discussed above, the mobile device 105 may use a GPS location mechanism prior to entering the structure 135. However, at the second position 140 and third position 145 within the structure 135, the mobile device 105 will likely rely on the LTS 130 for its position information. In an example, the LTS 130 may be communicatively coupled to a plurality of access points (e.g., WLAN), such as AP one 115, AP two 120, and AP three 125. In the example of WLAN, or other radio communication systems in which channel strength information between sender and receiver is obtained, the LTS 130 may use trilateration and known positions of the APs 115, 120, 125 to determine an LTS location for the mobile device 105. In an example, sensors may be employed by the LTS 130 to provide the LTS location. Such sensors may operate alone, or in combination with each other to provide, or refine, on LTS location. Example sensors may include, radio communications with beam forming steering capability, radio frequency identification (RFID) elements, mobile device 105 check-in (e.g., via an application) at a known location, etc.

As discussed above, the mobile device 105 may include a TEE arranged to communicate with the LTS 130 to obtain LTS locations in a secure manner. Because obtaining LTS locations may involve active communication (e.g., establishing and maintaining back-and-forth communication) on the part of the mobile device 105 to the LTS 130, the mobile device 105 may be arranged to efficiently gather LTS locations. In an example, the mobile device 105 may refrain from gathering LTS locations until the mobile device 105 has moved relative to the LTS coverage area (here illustrated as the structure 135). In an example, the mobile device 105 may refrain from gather the LTS locations until the information held by the mobile device 105 is considered stale, for example, after a predetermined time period.

The mobile device 105 may be arranged to present the LTS locations and the non-LTS locations in a similar manner to applications of the mobile device 105. Thus, the mobile device 105 may securely and efficiently gather LTS locations from the LTS 130, and allow applications to use the location data without dealing with alternate sources of the location data.

Figure 2:
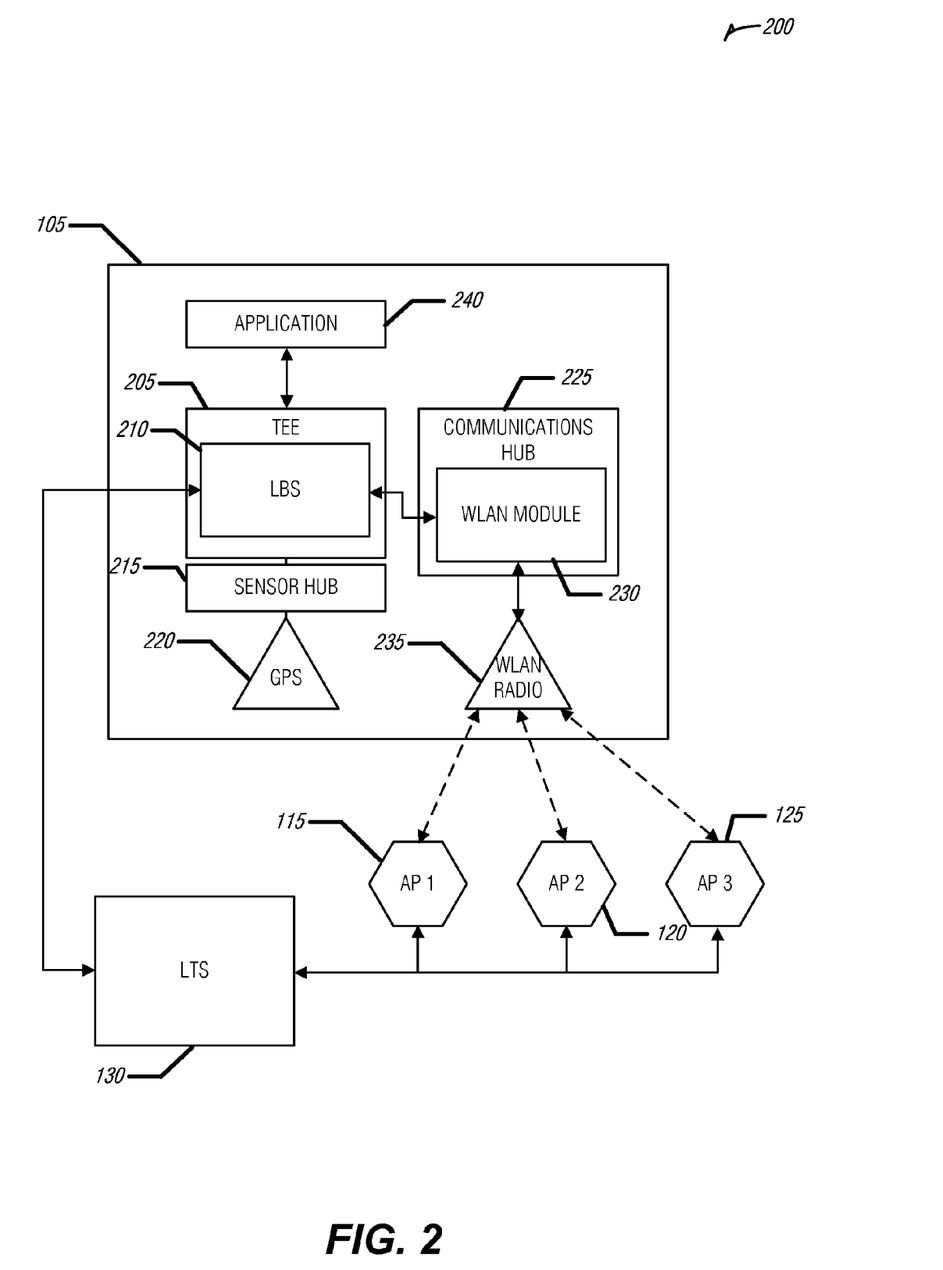
FIG. 2 illustrates an example of a system for securely managed LTS access, according to an embodiment.

FIG. 2 illustrates an example of a system 200 for securely managed LTS access. The system 200 may include a mobile device 105 and an LTS 130 with one or more APs (e.g., AP one 115, AP two 120, and AP three 125).

The mobile device 105 may include a communications hub 225, a TEE 205, an application 240, a sensor hub 215, and a GPS receiver 220. The communications hub 225 may include one or more communications modules, such as a WLAN module 230. The WLAN module 230 may be arranged to communicate (e.g., control) a WLAN radio 235 of the mobile device 105. Thus, the WLAN module 230 may facilitate communications on WLAN networks. In an example, the WLAN module 230 may be arranged to operate with an IEEE 802.11 family of standards.

The TEE 205 is a hardware supported execution environment that is resistant to tampering, snooping, or other undesirable activities by, for example, malicious users, malicious software, etc. TEEs may be used for secure storage of information (e.g., personal credentials such as passwords, identification, etc.), for authorizing application execution (e.g., application verification, etc.), for authorizing service access or participation, among other applications. Accordingly, the TEE 205 may include a processor, memory, or storage device. In an example, the TEE 205 may include a processor, memory, or storage device that is physically distinct (e.g., separated from) other analogous components of the mobile device 105 or a memories of the mobile device 105. In an example, the TEE 205 may use a processor, memory, or storage of the mobile device 105 that is rendered inaccessible, including temporarily, that is rendered inaccessible by entities other than the TEE 205 or components thereof. For example, address translation of the underlying memory may render impractical or impossible the addressing of the TEE memory from other devices (e.g., processors) of the mobile device 105. In an example, the TEE memory may include a set of cryptographic entities (e.g., certificates, keys, identifications, etc.). The TEE 205 may be arranged to use these cryptographic entities to encrypt data or communications and to validate executable code (e.g., applications) or data. In an example, the TEE 205 may include a management engine (ME) to perform one or more operations described above. In an example, the TEE 205 may include a converge security engine (CSE) to perform one or more operations described above.

The secure operations provided by the TEE 205 permit a level of trust in interfacing with exterior entities (e.g., the LTS 130) not otherwise available for the mobile device 105. Thus, security concerns of an LTS provider in sharing LTS location information may be allayed when LTS location requests originate from a TEE 205. Thus, the TEE 205 may include a location-based-service 210 (LBS) to obtain LTS location data from the LTS 130. The TEE 205 may also be configured without a separate LBS 210 to perform these operations. Thus, the TEE 205 may be arranged to establish (e.g., via the communications hub 225) a connection to the LTS 130.

In an example, the TEE 205 may be arranged to establish the connection to the LTS 130 in response to a determination that the mobile device 105 has physically moved relative to a coverage area of the LTS 130. For example, the TEE 205 may eschew constant communications, and thus power drain, with the LTS 130 in favor of an event based model in which the TEE 205 determines, or is informed (e.g., by the communications hub 225, sensor hub 215, etc.) that the mobile device 105 has moved into, out of, or within an LTS coverage area (e.g., the structure 135).

In an example, determining that the mobile device has physically moved relative to relative to a coverage area of the LTS 130 may include the communications hub 225 arranged to monitor a wireless signal (e.g., from one or more of AP one 115, AP two 120, or AP three 125) and compare an aspect of the wireless signal from at least two points in time (e.g., against a threshold). For example, the communications hub 225 may record signal strength from AP one 115 at two distinct times. These records may be compared to determine a change in this signal strength. If the change surpasses a threshold value, the communications hub 225 may conclude that the mobile device 105 has physically moved and alert the TEE 205. The use of the threshold permits acceptance of real-world operating conditions that may vary the signal strength and yet not be indicative of the mobile device 105 physically moving. The threshold may also be arranged to permit the movement determination to be that of the user 110 and not simply the mobile device 105. For example, by increasing the variation between the first and second signal strength record, a greater movement is needed before the threshold is reached. Thus, smaller movements of the mobile device 105, for example, in the hand of the user 110 while the user 110 is stationary may be ignored. Other example wireless signal aspects that may be monitored and compared include media access control (MAC) information (e.g., MAC address, basic service set (BSS) information, such as BSS identifier (BSSID) of an AP, etc.), movement indications from the network, or other indicators of changes to the wireless network accessible via the wireless signal. Thus, for example, the communications hub 225 may be arranged to determine that the mobile device 105 has moved when the number of APs available for connection has changed, or the identity of those APs has changed.

In an example, one or more sensor inputs from the sensor hub 215 may be used to determine movement of the mobile device 105. For example, a combination of compass and accelerometer data may be used to dead-recon movement of the mobile device 105. However, in an example, the TEE 205 may be arranged to establish the connection to the LTS 130 in response to determining that a specified time period from a last update has elapsed (e.g., time-based polling). Updating the LTS location only when the mobile device 105 moves may save resources without interruption to location-based-services on the mobile device 105 because the previously determined location of the mobile device 105 is valid until the mobile device 105 moves. This concept is also applicable to non-LTS (e.g., GNSS) services. That is, a variety of factors may be monitored to determine if the mobile device 105 moves before a GNSS location determination is attempted.

The TEE 205 may also be arranged to provide verification to the LTS that the connection originated from a TEE. In an example, the TEE 205 may be arranged to use an enhanced privacy identifier (EPID) for this verification. An EPID is an asymmetric key mechanism in which a plurality of private keys correspond to a single public key. Thus, a variety of TEEs may have unique private keys but function with the single public key. This public key may correspond to TEEs generally. In this manner, the TEE 205 may be verified without identifying the specific TEE 205.

In an example, the TEE 205 may be arranged to provide the verification by using a SIGMA key exchange protocol to establish a SIGMA session. As used herein, SIGMA (also known as SIGn-and-MAc) is a family of cryptographic key-exchange protocols that provide forward secrecy via a Diffie-Hellman exchange authenticated with digital signatures. In an example, an attestation exchange of the SIGMA session may be used to provide the TEE 205 verification to the LTS 130. In an example, the attestation exchange may include creating a hash of software components (e.g., portions or entireties thereof) of the mobile device 105.

In an example, the TEE 205 may be arranged to verify the identity of the LTS 130. For example, the TEE 205 may include an authority chain by which the TEE 205 may verify the signing authority of a digital certificate proffered by the LTS 130. In an example, the identification may be accomplished via a key exchange (e.g., SIGMA session establishment) with the LTS 130. In an example, the TEE 205 may be arranged to use pre-provisioned LTS credentials in the SGMA session to verify the identity of the LTS 130. In an example, the TEE 205 may be arranged to query a trust broker service (TBS) to receive attestation of LTS capabilities for the LTS 130. In an example, the attestation is of a privacy policy implementation of the LTS 130. In an example, the TEE 205 may maintain a set of trusted TBSs.

The TEE 205 may also be arranged to request, using the established connection to the LTS 130, an LTS location for the mobile device 105 from the LTS 130. In an example, the TEE may be arranged to identify the mobile device 105 to the LTS 130. In an example, the identification may be encrypted. In an example, the communications path by which the identification is communicated to the LTS 130 may be encrypted. In an example, the encryption may be performed using SIGMA session keys. In an example, the identification may be the MAC address of the mobile device 105. In an example, the identification may be derived from the MAC address of the mobile device 105. For example, the derived identification may be a hash of the MAC address. In an example, the identification may include an identity entity (e.g., username, certificate, etc.) known to the LTS 130. In an example, the TEE 205 may be arranged to transmit a privacy policy to, or to control a privacy policy of the LTS 130. In an example, the privacy policy transmission or control may be performed as part of the identification operation. In an example, the LTS is arranged to prevent disclosure of location information to an entity (e.g., computing platform) other than a TEE based requester. For example, if a requester cannot establish that an LTS location request is coming from a TEE 205, the LTS 130 refuses to provide an LTS location to that requester.

The TEE 205 may also be arranged to provide the LTS location—e.g., that was received from the LTS 130 in response to the request described above—to an application 240. In an example, the TEE 205 is arranged to provide the LTS location to the application 240 via a single location interface. In an example, the single location interface is the only interface provided by the TEE 205 by which physical location data (e.g., geographic coordinates) may be obtained. Thus, in an example, the single location interface may be arranged to provide both LTS locations and non-LTS locations (e.g., as determined via the GPS 220 or sensor hub 215). In an example, the LTS location and the non-LTS location provided by the single location interface use a common format arranged to abstract the source of the underlying information source. Thus, the application 240 may not only use the same interface to get location information indoors as well as outdoors, but the application 240 may handle the information from these sources in the same manner. In an example, the single location interface may be arranged to provide additional information that is dependent on source. For example, an LTS location may indicate a label for the location (e.g., "menswear") in addition to the common format information (e.g., coordinates). Thus, the application 240 may make use of this additional information.

Communications, or parts therefore between the mobile device 105 (including the TEE 205) and the LTS 103 may be encrypted as discussed above. Other encryption or identification mechanisms may also be used. Such mechanisms may include transport layer security (TLS), secure session layer (SSL), X.509 certificates, etc.

Providing location information without regard to the source of this information to applications in a mobile device reduces application development complexity (e.g., including time, money, errors, etc.). Further providing this information via a TEE 205 in the mobile device ensures greater security for the user and the LTS provider. Thus, the components discussed above with respect to FIGS. 1 and 2 address the issues of consistency and security present in current location based service applications.

Figure 3:
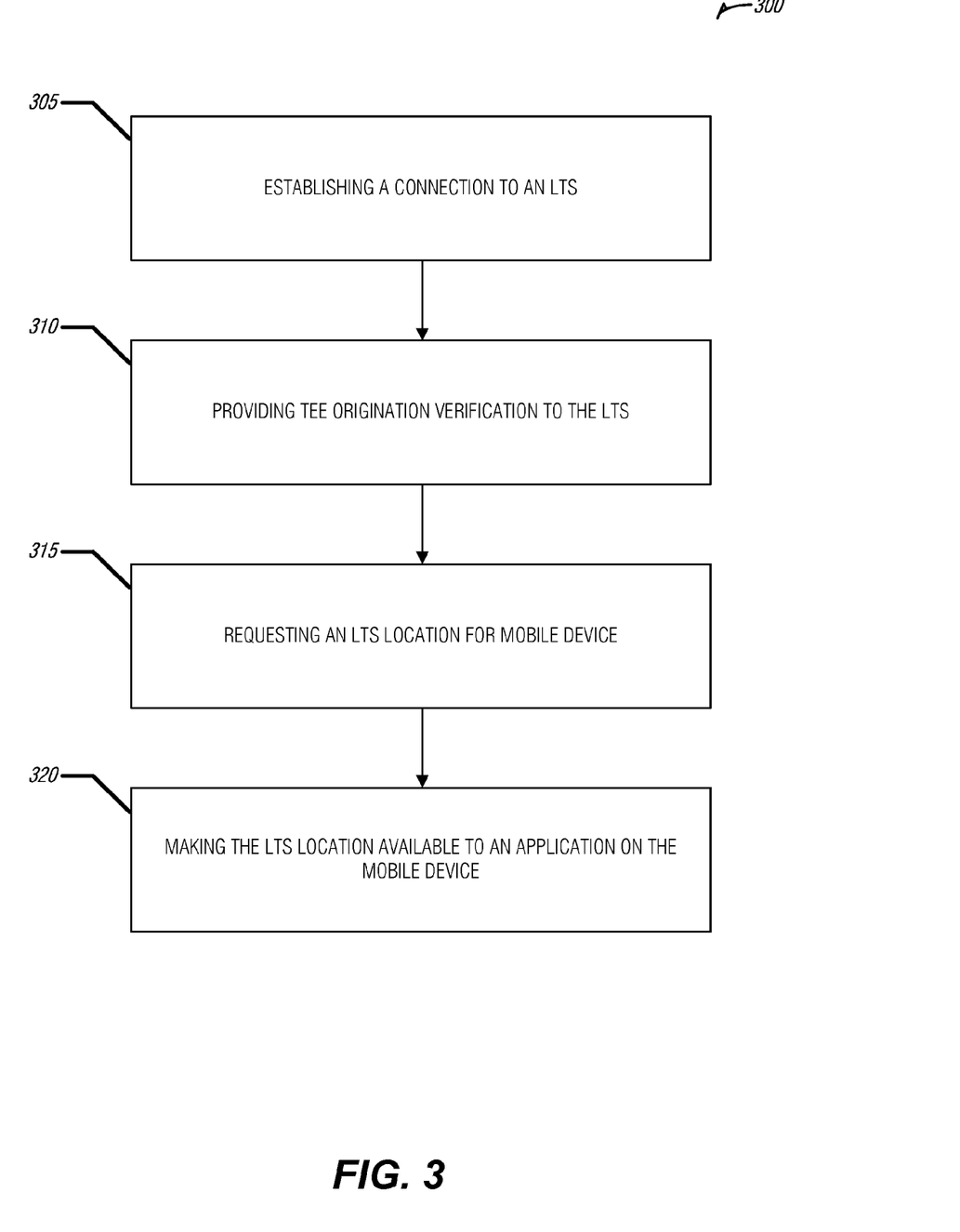
FIG. 3 illustrates an example of a method for securely managed LTS access, according to an embodiment.

FIG. 3 illustrates an example of a method 300 for securely managed LTS access. The operations of the method 300 are performed via hardware. Example hardware that may be used to perform any of the following operations includes those previously discussed with respect to FIGS. 1 and 2, or discussed below with respect to FIG. 4. In an example, the operations of the method 300 are performed by a mobile device communicating with an LTS. In an example, the LTS may be arranged to prevent disclosure of location information to an entity other than a TEE based requester. In an example, to prevent disclosure of location information (e.g., by the LTS) includes adhering to a privacy policy that may be controlled by the mobile device.

At operation 305, a connection to an LTS may be established by a TEE on a mobile device. In an example, establishing the connection may include verifying the identity of the LTS. In an example, verifying the identity of the LTS may include using pre-provisioned LTS credentials in a SIGMA session (e.g., used to connect to the LTS).

In an example, the connection may be established in response (e.g., not otherwise established) to determining that the mobile device has physically moved relative to a coverage area of the LTS. In an example, determining that the mobile device has physically moved may include monitoring a wireless signal and comparing an aspect of the wireless signal from two points in time against a threshold. In an example, the wireless signal may be a WLAN signal. In an example, the coverage area of the LTS may be a structure. In an example, the connection may be established in response to determining that a specified time period from a last update has elapsed.

At operation 310, verification that the connection originated from the TEE may be provided to the LTS by the TEE. In an example, providing the verification may include using a SIGMA key exchange protocol to create a SIGMA session.

At operation 315, an LTS location may be requested from the LTS using the connection. In an example, requesting the LTS location may include identifying the mobile device to the LTS. In an example, the identifying may be encrypted. For example, either an identification token, or the session in which identification tokens are passed may be encrypted. In an example, the encryption may include using SIGMA session keys (e.g., from a SIGMA session used to establish the connection to the LTS). In an example, the identifying includes a MAC address of the mobile device, for example, used as an identification token.

At operation 320, the LTS location may be provided to applications of the mobile device. In an example, providing the LTS location to applications of the mobile device may include providing a single location interface. In an example, the single location interface may be arranged to provide a non-LTS location to the applications. The LTS location and the non-LTS location may use a common format arranged to abstract the source of underlying information.

Figure 4:
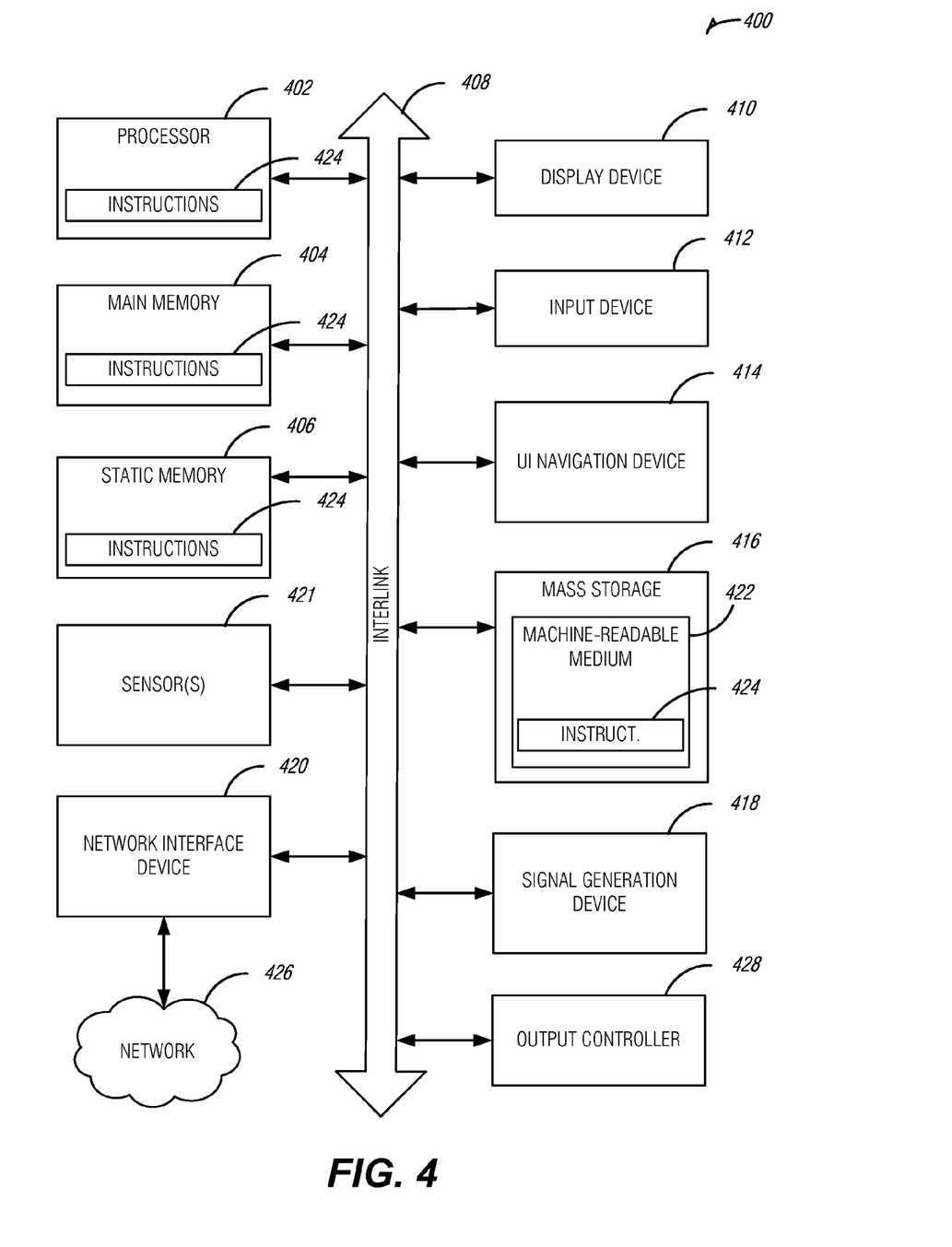
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (i.e., hardware) capable of performing specified operations. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to be a tangible entity, that is: physically constructed, specifically configured (e.g., hardwired), or temporarily (e.g., transitorily) configured (e.g., programmed) to operate in a specified manner to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.)) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., resting) mass. Thus, it is understood that a massed machine readable medium is not a transitory propagating signal. Specific examples of massed machine readable media may include: non-volatile memory, such as semiconductor memory devices (e.g., Electrically Programmable Read-Only Memory (EPROM), Electrically Erasable Programmable Read-Only Memory (EE- PROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 may include subject matter (such as a device, apparatus, or mobile device for securely managed LTS access) comprising a communications hub arranged to send and receive wireless communications signals, and a trusted execution environment (TEE). The TEE may be arranged to establish—via the communications hub—a connection to a location and tracking service (LTS), providing verification to the LTS that the connection originated from the TEE, request—using the connection—an LTS location for the mobile device from the LTS, and provide the LTS location to applications of the mobile device.

In Example 2, the subject matter of Example 1 may optionally include, wherein to provide the verification includes the TEE arranged to use a SIGMA key exchange protocol to create a SIGMA session.

In Example 3, the subject matter of Example 2 may optionally include, wherein to use the SIGMA key exchange protocol includes the TEE arranged to verify the identity of the LTS.

In Example 4, the subject matter of Example 3 may optionally include, wherein to verify the identity of the LTS includes the TEE arranged to use pre-provisioned LTS credentials in the SIGMA session.

In Example 5, the subject matter of any of Examples 1-4 may optionally include, wherein to request the LTS location includes the TEE arranged to identify the mobile device to the LTS, the TEE arranged to encrypt the identification.

In Example 6, the subject matter of Example 5 may optionally include, wherein the identification includes a media access control (MAC) address of the mobile device.

In Example 7, the subject matter of any of Examples 5-6 may optionally include, wherein the encryption uses SIGMA session keys.

In Example 8, the subject matter of any of Examples 1-7 may optionally include, wherein the TEE is arranged to establish the connection to the LTS in response to a determination that the mobile device has physically moved relative to a coverage area of the LTS.

In Example 9, the subject matter of Example 8 may optionally include, wherein to determine that the mobile device has physically moved includes the communications hub arranged to monitor a wireless signal, and compare an aspect of the wireless signal from two points in time against a threshold.

In Example 10, the subject matter of Example 9 may optionally include, wherein the wireless signal is a wireless local area network (WLAN) signal.

In Example 11, the subject matter of Example 10 may optionally include, wherein the coverage area of the LTS is a structure.

In Example 12, the subject matter of any of Examples 1-11 may optionally include, wherein the TEE is arranged to establish the connection to the LTS is in response to determining that a specified time period from a last update has elapsed.

In Example 13, the subject matter of any of Examples 1-12 wherein to provide the LTS location to applications of the mobile device includes the TEE arranged to provide a single location interface.

In Example 14, the subject matter of Example 13 may optionally include, wherein the single location interface is arranged to provide a non-LTS location to the applications, the LTS location and the non-LTS location using a common format arranged to abstract the source of underlying information.

In Example 15, the subject matter of any of Examples 1-14 may optionally include, wherein the LTS is arranged to prevent disclosure of location information to an entity other than a TEE based requester.

In Example 16, the subject matter of Example 15 may optionally include, wherein to prevent disclosure of location information includes the LTS arranged to adhere to a privacy policy, the privacy policy being controlled by the mobile device.

Example 17 may include, or may optionally be combined with the subject matter of any one of Examples 1-16 to include, subject matter (such as a method, means for performing acts, or machine readable medium including instructions that, when performed by a machine cause the machine to performs acts) comprising establishing—by a trusted execution environment (TEE) on the mobile device—a connection to a location-and-tracking service (LTS), providing—by the TEE—verification to the LTS that the connection originated from the TEE, requesting—using the connection—an LTS location for the mobile device from the LTS, and providing the LTS location to applications of the mobile device.

In Example 18, the subject matter of Example 17 may optionally include, wherein providing the verification includes using a SIGMA key exchange protocol to create a SIGMA session.

In Example 19, the subject matter of Example 18 may optionally include, wherein using the SIGMA key exchange protocol includes verifying the identity of the LTS.

In Example 20, the subject matter of Example 19 may optionally include, wherein verifying the identity of the LTS includes using pre-provisioned LTS credentials in the SIGMA session.

In Example 21, the subject matter of any of Examples 17-20 may optionally include, wherein requesting the LTS location includes identifying the mobile device to the LTS, the identifying being encrypted.

In Example 22, the subject matter of Example 21 may optionally include, wherein the identifying includes a media access control (MAC) address of the mobile device.

In Example 23, the subject matter of any of Examples 21-22 may optionally include, wherein the encryption uses SIGMA session keys.

In Example 24, the subject matter of any of Examples 17-23 may optionally include, wherein establishing the connection to the LTS is in response to determining that the mobile device has physically moved relative to a coverage area of the LTS.

In Example 25, the subject matter of Example 24 may optionally include, wherein determining that the mobile device has physically moved includes monitoring a wireless signal, and comparing an aspect of the wireless signal from two points in time against a threshold.

In Example 26, the subject matter of Example 25 may optionally include, wherein the wireless signal is a wireless local area network (WLAN) signal.

In Example 27, the subject matter of Example 26 may optionally include, wherein the coverage area of the LTS is a structure.

In Example 28, the subject matter of any of Examples 17-27 may optionally include, wherein establishing the connection to the LTS is in response to determining that a specified time period from a last update has elapsed.

In Example 29, the subject matter of any of Examples 17-28 may optionally include, wherein providing the LTS location to applications of the mobile device includes providing a single location interface.

In Example 30, the subject matter of Example 29 may optionally include, wherein the single location interface is arranged to provide a non-LTS location to the applications, the LTS location and the non-LTS location using a common format arranged to abstract the source of underlying information.

In Example 31, the subject matter of any of Examples 17-30 may optionally include, wherein the LTS is arranged to prevent disclosure of location information to an entity other than a TEE based requester.

In Example 32, the subject matter of Example 31 may optionally include, wherein to prevent disclosure of location information includes adhering to a privacy policy, the privacy policy being controlled by the mobile device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A mobile device for securely managed location-and-tracking service (LTS) access, the mobile device comprising:
   a communications hub arranged to send and receive wireless communications signals; and
   a trusted execution environment (TEE) arranged to:
      establish, via the communications hub, a connection to a LTS, wherein the TEE is arranged to establish the connection in response to at least one of a determination that the mobile device has physically moved relative to a coverage area of the LTS or a determination that a specified time period from a last update has elapsed;
      providing, by the TEE, verification to the LTS that the connection originated from the TEE;
      requesting, using the connection, an LTS location for the mobile device from the LTS; and
      making the LTS location available to applications of the mobile device.

2. The mobile device of claim 1, wherein to provide the verification includes the TEE arranged to use a SIGMA key exchange protocol to create a SIGMA session.

3. The mobile device of claim 2, wherein to establish the connection includes the TEE arranged to verify the identity of the LTS.

4. The mobile device of claim 3, wherein to verify the identity of the LTS includes the TEE arranged to use pre-provisioned LTS credentials in the SIGMA session.

5. The mobile device of claim 1, wherein to request the LTS location includes the TEE arranged to identify the mobile device to the LTS, the TEE arranged to encrypt the identification.

6. The mobile device of claim 5, wherein the identification includes a media access control (MAC) address of the mobile device.

7. The mobile device of claim 5, wherein the encryption uses SIGMA session keys.

8. The mobile device of claim 1, wherein to determine that the mobile device has physically moved includes the communications hub arranged to:
monitor a wireless signal; and
compare an aspect of the wireless signal from two points in time against a threshold.

9. The mobile device of claim 8, wherein the wireless signal is a wireless local area network (WLAN) signal.

10. The mobile device of claim 9, wherein the coverage area of the LTS is a structure.

11. The mobile device of claim 1, wherein to make the LTS location available to applications of the mobile device includes the TEE arranged to provide a single location interface.

12. The mobile device of claim 11, wherein the single location interface is arranged to provide a non-LTS location to the applications, the LTS location and the non-LTS location using a common format arranged to abstract a source of underlying information.

13. The mobile device of claim 1, wherein the LTS is arranged to prevent disclosure of location information to an entity other than a TEE based requester.

14. The mobile device of claim 13, wherein to prevent disclosure of location information includes the LTS arranged to adhere to a privacy policy, the privacy policy being controlled by the mobile device.

15. A non-transitory machine-readable medium including instructions that, when executed by a machine, cause the machine to perform operations for securely managed location-and-tracking service (LTS) access, the operations comprising:
establishing, by a trusted execution environment (TEE) on the mobile device, a connection to a LTS, wherein establishing the connection is in response to at least one of determining that the mobile device has physically moved relative to a coverage area of the LTS or determining that a specified time period from a last update has elapsed;
providing, by the TEE, verification to the LTS that the connection originated from the TEE;
requesting, using the connection, an LTS location for the mobile device from the LTS; and
making the LTS location available to applications of the mobile device.

16. The machine-readable medium of claim 15, wherein providing the verification includes using a SIGMA key exchange protocol to create a SIGMA session.

17. The machine-readable medium of claim of claim 16, wherein establishing the connection includes verifying the identity of the LTS.

18. The machine-readable medium of claim of claim 17, wherein verifying the identity of the LTS includes using pre-provisioned LTS credentials in the SIGMA session.

19. The machine-readable medium of claim of claim 15, wherein requesting the LTS location includes identifying the mobile device to the LTS, the identifying being encrypted.

20. The machine-readable medium of claim of claim 19, wherein the encryption uses SIGMA session keys.

21. The machine-readable medium of claim of claim 15, wherein determining that the mobile device has physically moved includes:
monitoring a wireless signal; and
comparing an aspect of the wireless signal from two points in time against a threshold.

22. The machine readable medium of claim 21, wherein the wireless signal is a wireless local area network (WLAN) signal.

23. A method performed by hardware elements of a mobile device for securely managed location-and-tracking service (LTS) access, the method comprising:
establishing, by a trusted execution environment (TEE) on the mobile device, a connection to a LTS, wherein establishing the connection is in response to at least one of determining that the mobile device has physically moved relative to a coverage area of the LTS or determining that a specified time period from a last update has elapsed;
providing, by the TEE, verification to the LTS that the connection originated from the TEE;
requesting, using the connection, an LTS location for the mobile device from the LTS; and
making the LTS location available to applications of the mobile device.

24. The method of claim of claim 23, wherein determining that the mobile device has physically moved includes: monitoring a wireless signal; and comparing an aspect of the wireless signal from two points in time against a threshold.

25. The method of claim 24, wherein the wireless signal is a wireless local area network (WLAN) signal.

* * * * *